United States Patent
Casterline et al.

(10) Patent No.: US 9,463,539 B2
(45) Date of Patent: Oct. 11, 2016

(54) WIRELESS CLAMP TOOL

(71) Applicant: C.E. Electronics, Bryan, OH (US)

(72) Inventors: Tony Casterline, Edgerton, OH (US); Garry L. Courtney, Bryan, OH (US); Taylor Robert, Montpelier, OH (US); Ralph P. Wharry, Oakwood, OH (US); Charles Simpkins, Fort Wayne, IN (US); Tom Booms, South Lyon, MI (US)

(73) Assignee: C.E. Electronics Inc., Bryan, OH (US)

( * ) Notice: Subject to any disclaimer, the term of this patent is extended or adjusted under 35 U.S.C. 154(b) by 488 days.

(21) Appl. No.: 14/080,924

(22) Filed: Nov. 15, 2013

(65) Prior Publication Data
US 2015/0135523 A1   May 21, 2015

(51) Int. Cl.
   *G08B 1/08*    (2006.01)
   *B23P 19/04*   (2006.01)
   *B25B 5/16*    (2006.01)

(52) U.S. Cl.
   CPC ............... *B23P 19/04* (2013.01); *B25B 5/16* (2013.01); *Y10T 29/53039* (2015.01)

(58) Field of Classification Search
   CPC ................................................... B23P 19/04
   USPC ............ 340/539.11, 680; 702/41; 73/379.01, 73/379.02
   See application file for complete search history.

(56) References Cited

U.S. PATENT DOCUMENTS

| | | | |
|---|---|---|---|
| 6,347,554 B1 | 2/2002 | Klingler | |
| 6,349,266 B1* | 2/2002 | Lysaght | B25B 23/14 702/41 |
| 6,430,463 B1 | 8/2002 | Lysaght | |
| 6,450,299 B1 | 9/2002 | Lysaght | |
| 6,758,098 B1* | 7/2004 | Nunnelee | B25B 5/101 269/217 |
| 7,174,973 B1 | 2/2007 | Lysaght | |
| 2010/0023152 A1 | 1/2010 | Lysaght | |
| 2014/0076058 A1* | 3/2014 | Brugger | G01L 9/0041 73/723 |

\* cited by examiner

*Primary Examiner* — Toan N Pham
(74) *Attorney, Agent, or Firm* — Emch, Schaffer, Schaub & Porcello Co., L.P.A.

(57) ABSTRACT

This system is a tool and monitor assembly that verifies clamps have been activated properly with the tool. The radio controlled clamp tool provides accountability and control with a strain gauge operation. The radio tool is designed to perform the operation of clamp tool, retain the signature and transmit the signal with data to an interface box for error proofing or tool analysis.

11 Claims, 4 Drawing Sheets

WIRELESS CLAMP TOOL

FIELD OF THE INVENTION

This invention relates to a wireless clamp tool. More specifically, the invention relates to an apparatus that controls and monitors the operation of the clamp tool.

BACKGROUND OF THE INVENTION

Past embodiments of qualifier technologies have proved challenging when implemented in some production facilities. Many manufacturers would prefer to "cut the cord" and go wireless so that additional cables have to be used in the assembly process. The challenges of creating a wireless tool lie in the current consumption of the microprocessor, tool monitors and tool controllers. In order to operate from a battery and maximize the life of that battery, low power states need to be employed when the tool is at rest and fastenings are not taking place.

Assembly plants are filled with tools, tool monitors, and tool controllers. A typical tool monitor will supervise the tool's fastening process and then report back to both the operator and the system if the fastening was good or bad (OK/NOK). In many cases it would be advantageous to eliminate the signal cables and replace them with radio transceivers.

SUMMARY OF THE INVENTION

This invention is a tool and monitor assembly that verifies clamps have been installed properly with the tool. The radio controlled clamp tool provides accountability and control with a strain gauge sensor operation. The radio tool is designed to perform the operation of a clamp tool, retain the signature and transmit the signal with data to an interface box for error proofing analysis.

The tool is battery operated and uses a moment-insensitive flexure design to normalize the force of the strain gauge to provide an accurate representation of the characteristics of the clamp. These are recorded by an onboard microprocessor analyzed to determine if within predetermined specifications and then transmitted wirelessly to a receiver. The tool is equally effective at sensing a twisting action, push or pulling and or straight on prying action, allowing the tool to access clamps regardless of their orientation and or obstructions. The Tool is designed to work with various clamp types including Popp, Spring Band and Pull Pin Clamp but not excluding similar type clamps.

Other objects and advantages of the present invention will become apparent to those skilled in the art upon a review of the following detailed description of the preferred embodiments and the accompanying drawings.

BRIEF DESCRIPTIONS OF THE DRAWINGS

DETAILED DESCRIPTION OF THE INVENTION

The tool is an apparatus consisting of an effector to release the clamp, A flexure with applied electronic strain gauges to sense the forces being applied to and received from the release action of the clamp, a circuit to amplify and convert the analog electrical signals into a digital representations of the signals, a microprocessor to record and analyze the data produced by the electrical signals, and a radio transceiver to transmit an indication that a clamp has been released to the assembly control box. Transmission of the signals operates in the 900 MHZ or the 2.4 GHZ ranges.

The tools are sized to the clamps that need to be measured, the tools then need to be learned to the receivers that are to receive and process the data. This RF system includes a clamping tool having a transmitter for sending electrical signals to a receiver; and a remote qualifier having a receiver for receiving the electrical signals from the transmitter of the clamping tool.

In the preferred embodiment, the programmed micro processor of the clamping tool is configured to identify and store a portion of the electrical signal as a calibration value. The value of each operation is then compared to the calibration value and then will give a accept or reject signal at the completion of a successful cycle.

This system changes the algorithms to record and read the strain gauge data into an electrical signal representative of the pressure used to bend the strain gauge therefore plotting the data over time to determine the signature of the gauge. The signature is then compared with the stored data and then outputs a accept or reject based on the comparison of the cycle.

Figure 1:
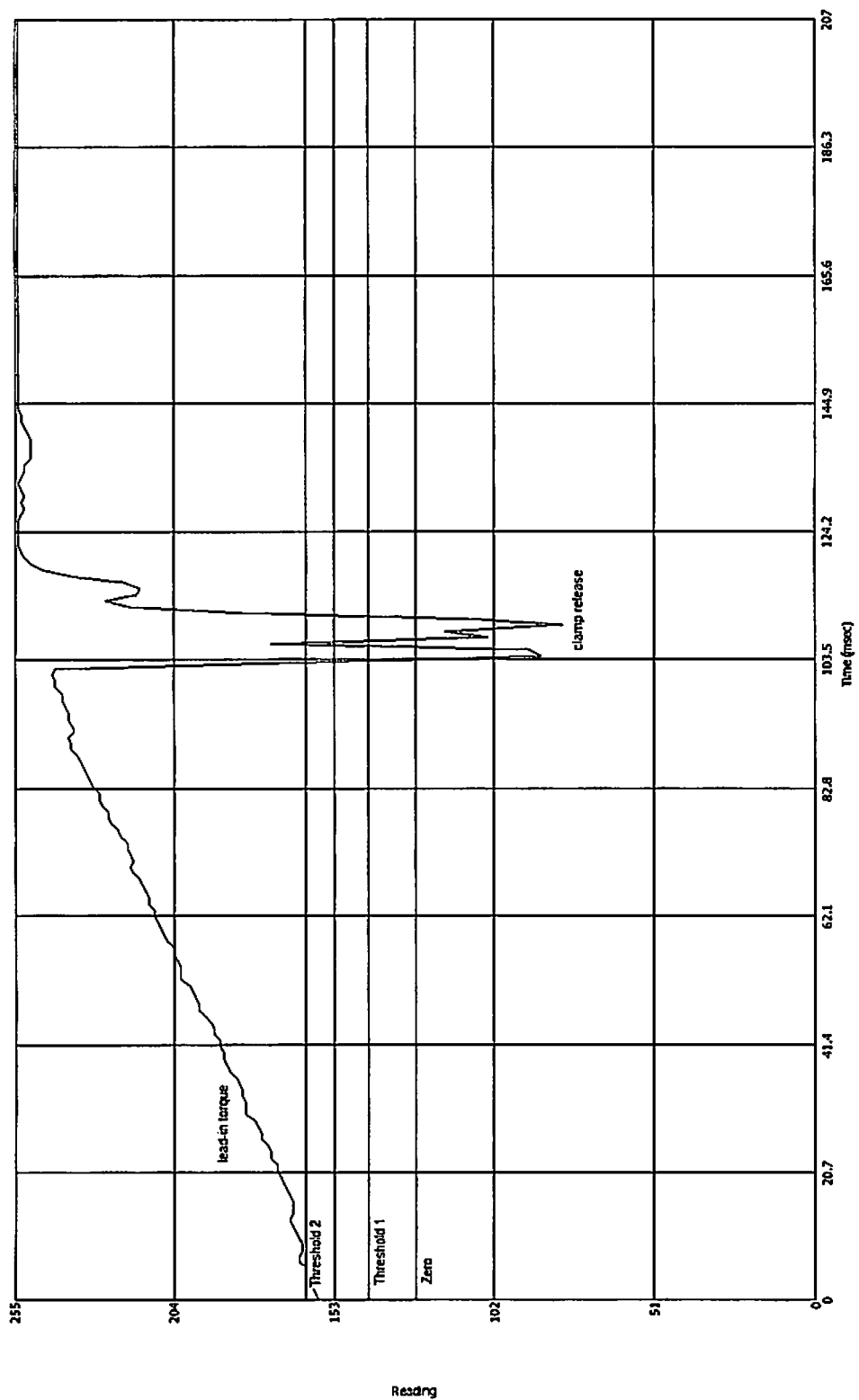
FIG. 1 shows a typical signal during clamping.

FIG. 1 shows a typical signal during clamping.

FIG. 1 shows typical signal levels during clamping, approved clamping and clamp release. Signal level rose above threshold level and remained above calibrated window for the minimum time. The signal level then dropped below threshold level when the clamp released.

EXAMPLE I

Figure 2:
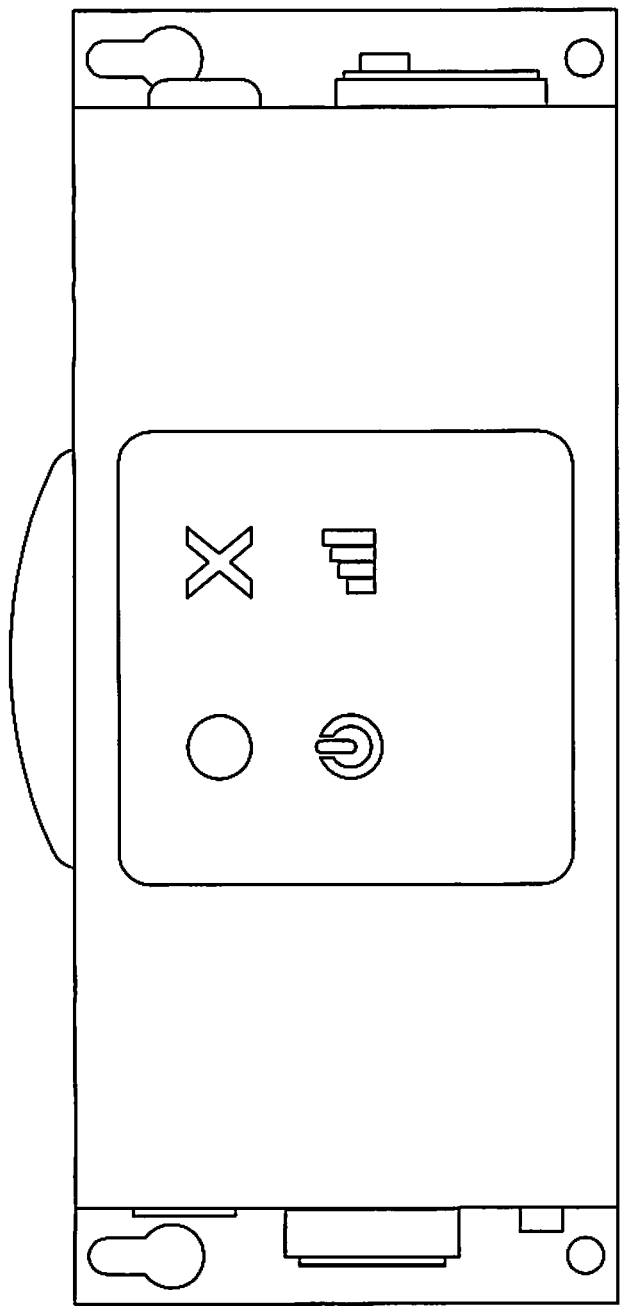
FIG. 2 is an RF enclosure for receiving and processing RF signals from an electrical strain gauge sensor.

FIG. 2 is an RF enclosure for receiving and processing RF signals from an electrical strain gauge sensor. FIG. 2 shows that the radio receiver and micro processor is an interface box that receives data signals from the clamping tool that are recorded and analyzed by an on-board microprocessor to uniquely identify the characteristics of the clamp and determine if the operation was completed as per the specification. The receiver and tool are paired wirelessly and securely. Two-way communication allows for the tool to verify if the data was successfully transmitted from the tool to the receiver. The receiver then generates audible and visual accept and reject outputs. The interface box also monitors signal strength and battery strength of the tool.

Features:
  Microprocessor design
  Ultra bright LED indicators
  900 Mhz or 2.4 GHz wireless transmission
  90-240 vac 50/60 power inputs
  IEC on/off power cable interface
  Configurable dry contact outputs
  Key switch protected programming
  UUCSA
  FCC/CE registered
  Patented The transistor connects the microprocessor to an alarm which indicates incomplete and completed tool cycles. Relays are NO or NC momentary or latching relay outputs. Output 1 provides a signal on a incomplete cycle. Output 2 provides a signal on a completed cycle.

Figure 3:
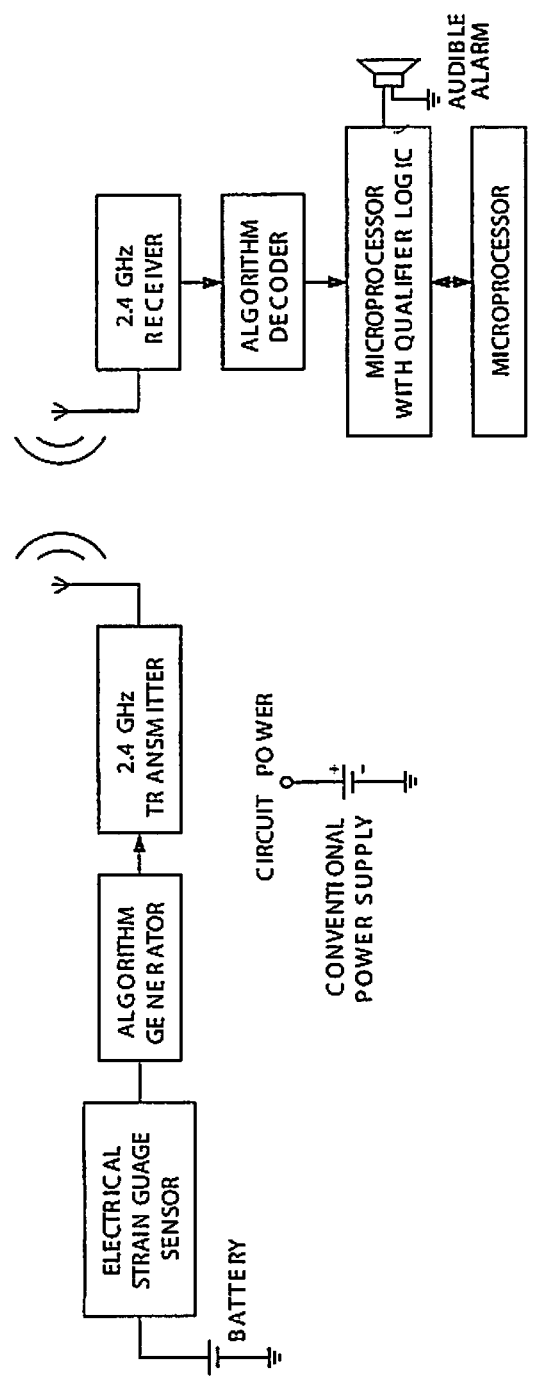
FIG. 3 is a block diagram for using a batter powered, wireless tool using an electrical strain gauge sensor.

FIG. 3 shows the system of this invention in greater detail. FIG. 3 shows the strain gauge sensor, a battery, algorithm generator, transmitter and RF antenna. FIG. 3 also shows A/D converter and microprocessor in greater detail. Included are RF antenna, 900 MHz or 2.4 GHz receiver, algorithm decoder, microprocessor and alarm. Also included are additional microprocessor and conventional power supply. Microprocessor monitors the low battery function and may provide additional capacity to processor.

Figure 4:
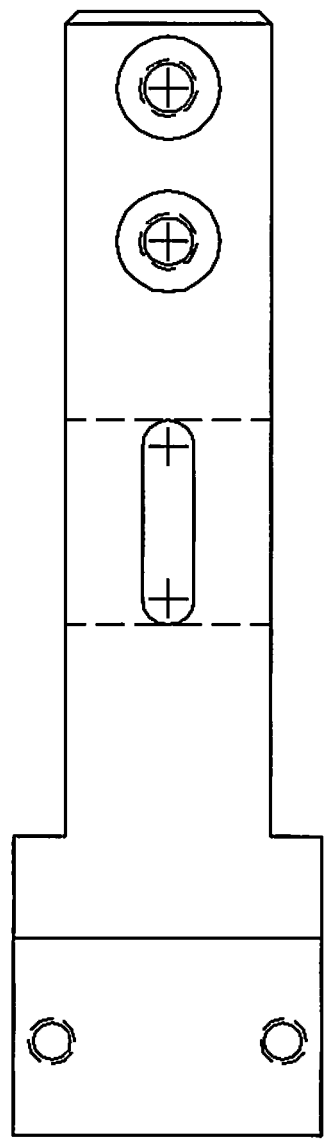
FIG. 4 is a drawing of the beam.

FIG. 4 shows the beam strain gauge sensor of FIG. 3 in greater detail.

EXAMPLE II

The clamping tool is designed to perform the operation of a clamp, retain the signature and transmit the signal with data to an interface box for error proofing anaylsis.

The tool is battery operated and utilizes a moment-insensitive flexure design to normalize the force of the strain gauge to provide an accurate representation of the characteristics of clamp. These are recorded by an on-board microprocessor analyzed to determine if the operation is within predetermined specifications and then transmitted wirelessly to a receiver. The tool is equally effective at sensing a twisting action or a straight on prying, push or pull action, allowing the tool to access clamps regardless of their orientation and/or obstructions.

Features:
Microprocessor design
Ruggedized strain gauges
Battery operated (2 AA cells)
Long battery life
900 MHz or 2.4 GHz FCC approved radio outputs
On/Off Switch
Compact design
Interchangeable heads In addition to these embodiments, persons skilled in the art can see that numerous modifications and changes may be made to the above invention without departing from the intended spirit and scope thereof.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A system for monitoring and controlling a wireless, mechanical tool comprising:
   a wireless, mechanical clamp tool including a wireless strain gauge sensor for transmitting electrical signals to a wireless receiver;
   a remote qualifier including the wireless receiver for receiving the electrical signals from the wireless strain gauge sensor of the mechanical tool;
   wherein the remote qualifier also includes a means for electrically computationally processing the electrical signals into other signals representing at least one parameter corresponding to a condition of the mechanical tool being monitored which is a function of the condition, wherein the means for electrically processing the signals includes a programmed microprocessor configured to identify a portion of the signals representative of the mechanical clamp tool corresponding to the parameter and wherein the programmed microprocessor is configured to identify and store the parameter of a first period of time for the electrical signal to attain a predetermined level and also configured to identify and store a second period of time for the electrical signal to remain at that level; and
   wherein the tool further comprises a moment-insensitive flexure design configured to normalize a force on the strain gauge and configured to provide a representation of characteristics of the clamp.

2. A system according to claim 1 wherein the transmitter is a radio frequency transmitter and the receiver is a radio frequency receiver.

3. A system according to claim 1 wherein the programmed microprocessor is configured to identify and store a portion of the electrical signal as a calibration value.

4. A system according to claim 3 wherein the programmed microprocessor is configured to identify and store the parameter of a threshold corresponding to the calibration value.

5. A system according to claim 1 wherein the programmed microprocessor is configured to identify a portion of the signals representative of the electrical signal of the mechanical tool clamping and successfully completing a cycle.

6. A system according to claim 1 wherein the programmed microprocessor is configured to generate signals when a cycle is completed unsuccessfully.

7. A system according to claim 1 wherein the programmed microprocessor is configured to ignore signals that do not meet the identified and stored parameter.

8. A system according to claim 1 wherein a battery provides power to the transmitter.

9. A system according to claim 8 wherein the transmitter includes a means to monitor the power of the battery and the means to transmit a low battery signal to the receiver.

10. A system according to claim 1 configured to perform an operation of a clamp tool, retain a signature and transmit a signal with data for error proofing analysis.

11. A system according to claim 1 wherein the strain gauge sensor is a beam.

* * * * *